US012302367B2

(12) United States Patent
He et al.

(10) Patent No.: US 12,302,367 B2
(45) Date of Patent: May 13, 2025

(54) LINK MANAGEMENT FOR SIDELINK

(71) Applicant: QUALCOMM Incorporated, San Diego, CA (US)

(72) Inventors: Linhai He, San Diego, CA (US); Seyedkianoush Hosseini, San Diego, CA (US); Gokul Sridharan, Sunnyvale, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 17/167,935

(22) Filed: Feb. 4, 2021

(65) Prior Publication Data

US 2021/0321275 A1    Oct. 14, 2021

Related U.S. Application Data

(60) Provisional application No. 63/007,056, filed on Apr. 8, 2020.

(51) Int. Cl.
| | |
|---|---|
| *H04W 72/40* | (2023.01) |
| *H04L 1/1812* | (2023.01) |
| *H04L 5/00* | (2006.01) |
| *H04L 69/28* | (2022.01) |
| *H04W 24/08* | (2009.01) |
| *H04W 24/10* | (2009.01) |
| *H04W 74/0808* | (2024.01) |
| *H04W 76/30* | (2018.01) |
| *H04W 88/04* | (2009.01) |
| *H04W 92/18* | (2009.01) |

(52) U.S. Cl.
CPC ........... *H04W 72/40* (2023.01); *H04L 1/1812* (2013.01); *H04L 5/0048* (2013.01); *H04L 69/28* (2013.01); *H04W 24/08* (2013.01); *H04W 24/10* (2013.01); *H04W 74/0808* (2013.01); *H04W 76/30* (2018.02); *H04W 88/04* (2013.01); *H04W 92/18* (2013.01)

(58) Field of Classification Search
None
See application file for complete search history.

(56) References Cited

U.S. PATENT DOCUMENTS

| | | | | |
|---|---|---|---|---|
| 10,542,475 | B1 * | 1/2020 | Singh | H04W 76/28 |
| 10,708,887 | B1 * | 7/2020 | Evans | H04W 72/02 |

(Continued)

FOREIGN PATENT DOCUMENTS

| | | |
|---|---|---|
| CN | 105338471 A | 2/2016 |
| CN | 107710858 A | 2/2018 |

(Continued)

OTHER PUBLICATIONS

International Search Report and Written Opinion—PCT/US2021/070131—ISA/EPO—Aug. 31, 2021.

(Continued)

*Primary Examiner* — Adnan Baig
(74) *Attorney, Agent, or Firm* — Harrity & Harrity, LLP

(57) ABSTRACT

Various aspects of the present disclosure generally relate to wireless communication. In some aspects, a user equipment (UE) may determine whether a sidelink to another UE is inactive, and disable the sidelink based at least in part on determining that the sidelink is inactive. Numerous other aspects are provided.

28 Claims, 9 Drawing Sheets

(56) References Cited

U.S. PATENT DOCUMENTS

| | | |
|---|---|---|
| 12,022,503 B2 * | 6/2024 | Park ................ H04L 41/0803 |
| 2004/0017792 A1 * | 1/2004 | Khaleghi ............ H04W 76/27 |
| | | 370/335 |
| 2014/0010070 A1 * | 1/2014 | Hayashitani ........ H04B 17/336 |
| | | 370/221 |
| 2016/0142974 A1 | 5/2016 | Lindoff et al. |
| 2017/0019886 A1 | 1/2017 | Patel et al. |
| 2017/0041875 A1 | 2/2017 | Lu et al. |
| 2017/0048922 A1 * | 2/2017 | Lee ...................... H04W 76/38 |
| 2017/0171837 A1 * | 6/2017 | Chen ................... H04W 72/20 |
| 2018/0027429 A1 | 1/2018 | Li et al. |
| 2018/0035336 A1 * | 2/2018 | Wang ................. H04W 36/08 |
| 2018/0213588 A1 | 7/2018 | Wei et al. |
| 2019/0098686 A1 | 3/2019 | Martin et al. |
| 2019/0159076 A1 | 5/2019 | Kim |
| 2019/0313354 A1 | 10/2019 | Gupta et al. |
| 2020/0053824 A1 | 2/2020 | He |
| 2022/0124678 A1 * | 4/2022 | Lee .................. H04W 72/1263 |
| 2022/0174695 A1 * | 6/2022 | Lee ...................... H04L 1/1896 |
| 2022/0232669 A1 * | 7/2022 | Yang ................... H04W 76/14 |
| 2022/0295590 A1 * | 9/2022 | Yang ................... H04W 76/30 |

FOREIGN PATENT DOCUMENTS

| | | |
|---|---|---|
| CN | 109891947 A | 6/2019 |
| CN | 110622616 A | 12/2019 |
| CN | 110622617 A | 12/2019 |
| EP | 3273745 A1 | 1/2018 |
| WO | 2017196246 A2 | 11/2017 |

OTHER PUBLICATIONS

ZTE Corporation, et al., "Consideration on AS Level Sidelink Management", 3GPP TSG RAN WG2 Meeting #105bis, R2-1903629, Xi'an, China, Apr. 8-12, 2019, XP051700971, 3 Pages.

ZTE Corporation, et al., "Consideration on Sidelink RLM Management", 3GPP TSG RAN WG2 Meeting #107bis, R2-1912388, Chongqing, China, Oct. 14-18, 2019, XP051803868, 3 Pages.

* cited by examiner

LINK MANAGEMENT FOR SIDELINK

CROSS REFERENCE TO RELATED APPLICATION

This Patent Application claims priority to U.S. Provisional Patent Application No. 63/007,056, filed on Apr. 8, 2020, entitled "LINK MANAGEMENT FOR SIDELINK," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for link management for sidelink.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, or a 5G Node B.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE, NR, and other radio access technologies.

SUMMARY

In some aspects, a method of wireless communication, performed by a user equipment (UE), may include determining whether a sidelink to another UE is inactive, and disabling the sidelink based at least in part on determining that the sidelink is inactive.

In some aspects, a method of wireless communication, performed by a UE, may include determining whether a quality of a sidelink to another UE satisfies a quality threshold, and disabling the sidelink based at least in part on determining that the quality of the sidelink does not satisfy the quality threshold.

In some aspects, a method of wireless communication, performed by a UE, may include determining whether an amount of unavailability of a sidelink to another UE satisfies an unavailability threshold, and disabling the sidelink based at least in part on determining that the amount of unavailability of the sidelink satisfies the unavailability threshold.

In some aspects, a method of wireless communication, performed by a base station, may include receiving, from a first UE, a message indicating that the first UE is releasing a sidelink with a second UE, and adjusting one or more relay procedures associated with the first UE and the second UE based at least in part on receiving the message.

In some aspects, a UE for wireless communication may include a memory and one or more processors operatively coupled to the memory. The memory and the one or more processors may be configured to determine whether a sidelink to another UE is inactive, and disable the sidelink based at least in part on determining that the sidelink is inactive.

In some aspects, a UE for wireless communication may include a memory and one or more processors operatively coupled to the memory. The memory and the one or more processors may be configured to determine whether a quality of a sidelink to another UE satisfies a quality threshold, and disable the sidelink based at least in part on determining that the quality of the sidelink does not satisfy the quality threshold.

In some aspects, a UE for wireless communication may include a memory and one or more processors operatively coupled to the memory. The memory and the one or more processors may be configured to determine whether an amount of unavailability of a sidelink to another UE satisfies an unavailability threshold, and disable the sidelink based at least in part on determining that the amount of unavailability of the sidelink satisfies the unavailability threshold.

In some aspects, a base station for wireless communication may include a memory and one or more processors operatively coupled to the memory. The memory and the one or more processors may be configured to receive, from a first UE, a message indicating that the first UE is releasing a sidelink with a second UE, and adjust one or more relay procedures associated with the first UE and the second UE based at least in part on receiving the message.

In some aspects, a non-transitory computer-readable medium may store one or more instructions for wireless communication. The one or more instructions, when executed by one or more processors of a UE, may cause the one or more processors to determine whether a sidelink to another UE is inactive, and disable the sidelink based at least in part on determining that the sidelink is inactive.

In some aspects, a non-transitory computer-readable medium may store one or more instructions for wireless communication. The one or more instructions, when executed by one or more processors of a UE, may cause the one or more processors to determine whether a quality of a sidelink to another UE satisfies a quality threshold, and disable the sidelink based at least in part on determining that the quality of the sidelink does not satisfy the quality threshold.

In some aspects, a non-transitory computer-readable medium may store one or more instructions for wireless communication. The one or more instructions, when executed by one or more processors of a UE, may cause the one or more processors to determine whether an amount of unavailability of a sidelink to another UE satisfies an unavailability threshold, and disable the sidelink based at least in part on determining that the amount of unavailability of the sidelink satisfies the unavailability threshold.

In some aspects, a non-transitory computer-readable medium may store one or more instructions for wireless communication. The one or more instructions, when executed by one or more processors of a base station, may cause the one or more processors to receive, from a first UE, a message indicating that the first UE is releasing a sidelink with a second UE, and adjust one or more relay procedures associated with the first UE and the second UE based at least in part on receiving the message.

In some aspects, an apparatus for wireless communication may include means for determining whether a sidelink to another apparatus is inactive, and means for disabling the sidelink based at least in part on determining that the sidelink is inactive.

In some aspects, an apparatus for wireless communication may include means for determining whether a quality of a sidelink to another apparatus satisfies a quality threshold, and means for disabling the sidelink based at least in part on determining that the quality of the sidelink does not satisfy the quality threshold.

In some aspects, an apparatus for wireless communication may include means for determining whether an amount of unavailability of a sidelink to another apparatus satisfies an unavailability threshold, and means for disabling the sidelink based at least in part on determining that the amount of unavailability of the sidelink satisfies the unavailability threshold.

In some aspects, an apparatus for wireless communication may include means for receiving, from a first UE, a message indicating that the first UE is releasing a sidelink with a second UE, and means for adjusting one or more relay procedures associated with the first UE and the second UE based at least in part on receiving the message.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
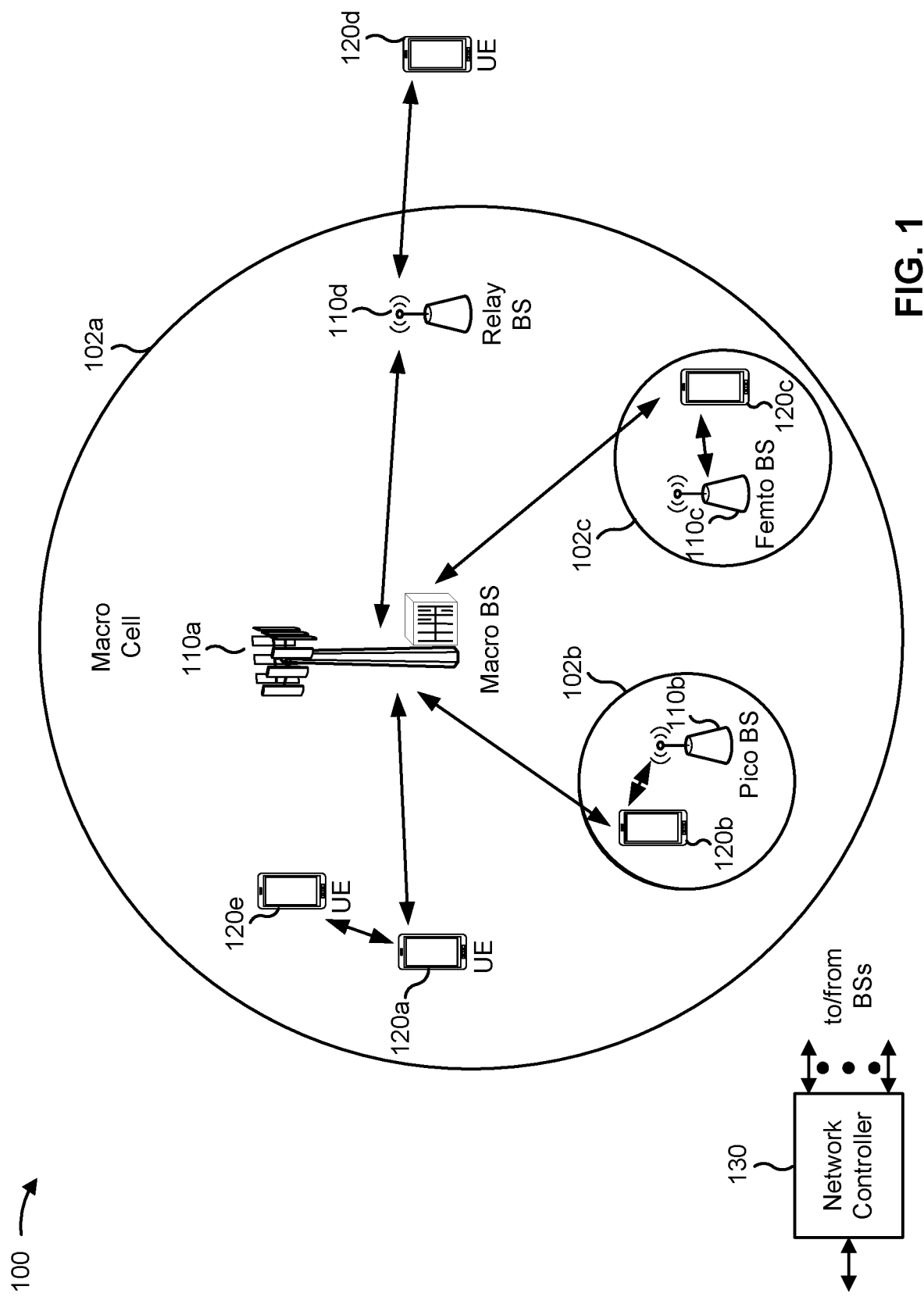
FIG. 1 is a diagram illustrating an example of a wireless network, in accordance with the present disclosure.

FIG. 1 is a diagram illustrating an example of a wireless network 100 in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, or a transmit receive point (TRP). Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, or a virtual network using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, or a relay.

Wireless network 100 may be a heterogeneous network that includes BSs of different types, such as macro BSs, pico BSs, femto BSs, and/or relay BSs. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, and/or an air interface. A frequency may also be referred to as a carrier, and/or a frequency channel Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, or a vehicle-to-infrastructure (V2I) protocol), and/or a mesh network. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

Figure 2:
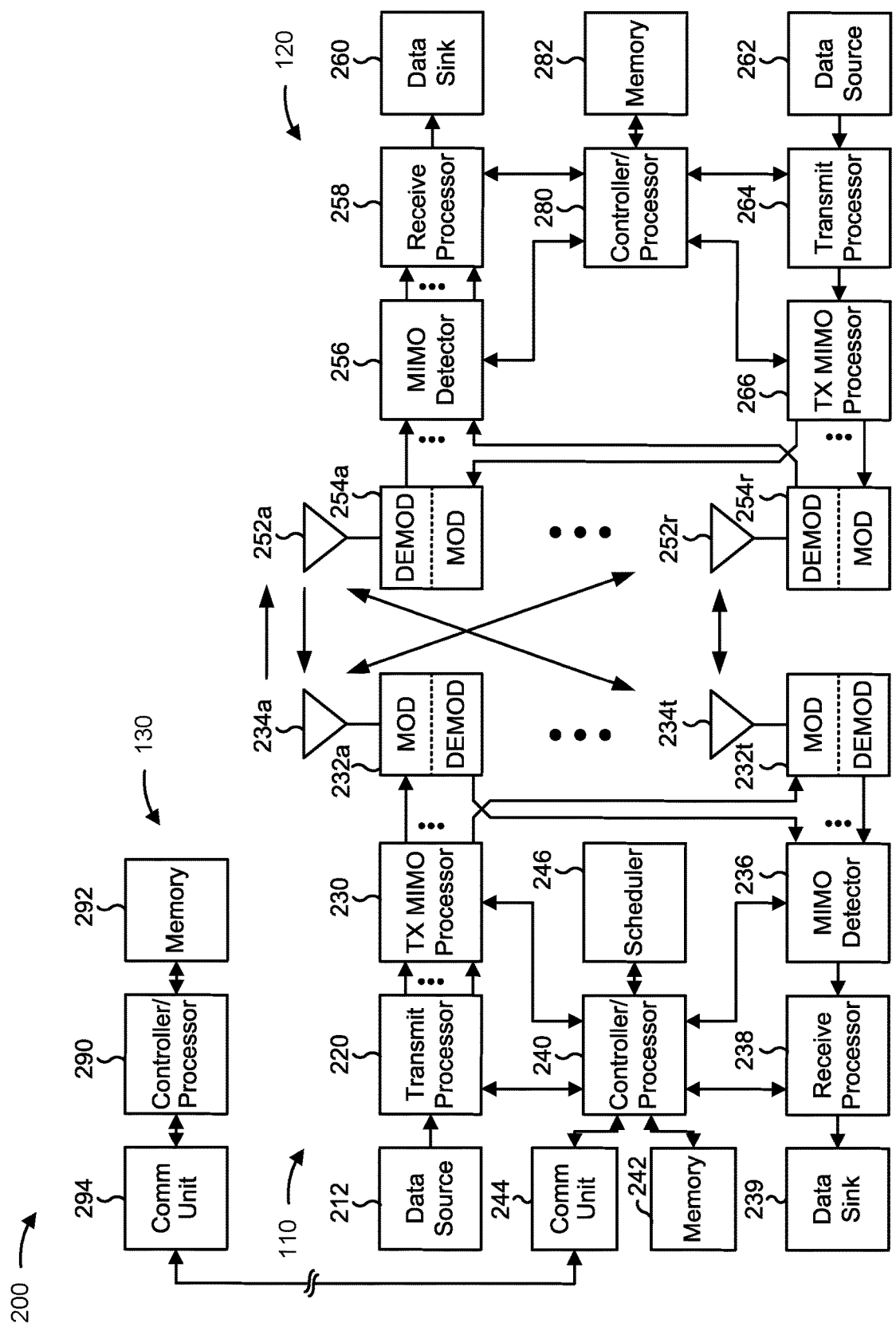
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, upper layer signaling) and provide overhead symbols and control symbols. Transmit processor 220 may also generate reference symbols for reference signals (e.g., a cell-specific reference signal (CRS), a demodulation reference signal (DMRS)) and synchronization signals (e.g., the primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), and/or CQI, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-9.

Controller/processor 240 of base station 110, controller/processor 280 of UE 120, and/or any other component(s) of FIG. 2 may perform one or more techniques associated with link management for sidelink, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, process 800 of FIG. 8, process 900 of FIG. 9, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, UE 120 may include means for determining whether a sidelink to another UE is inactive, means for disabling the sidelink based at least in part on determining that the sidelink is inactive, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, UE 120 may include means for determining whether a quality of a sidelink to another UE satisfies a quality threshold, means for disabling the sidelink based at least in part on determining that the quality of the sidelink does not satisfy the quality threshold, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for determining whether an amount of unavailability of a sidelink to another UE satisfies an unavailability threshold, means for disabling the sidelink based at least in part on determining that the sidelink satisfies the unavailability threshold, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for receiving, from a first UE, a message indicating that the first UE is releasing a sidelink with a second UE, means for adjusting one or more relay procedures associated with the first UE and the second UE based at least in part on receiving the message, and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, and/or antenna 234.

As indicated above, FIG. 2 is provided as an example. Other examples may differ from what is described with regard to FIG. 2.

Figure 3:
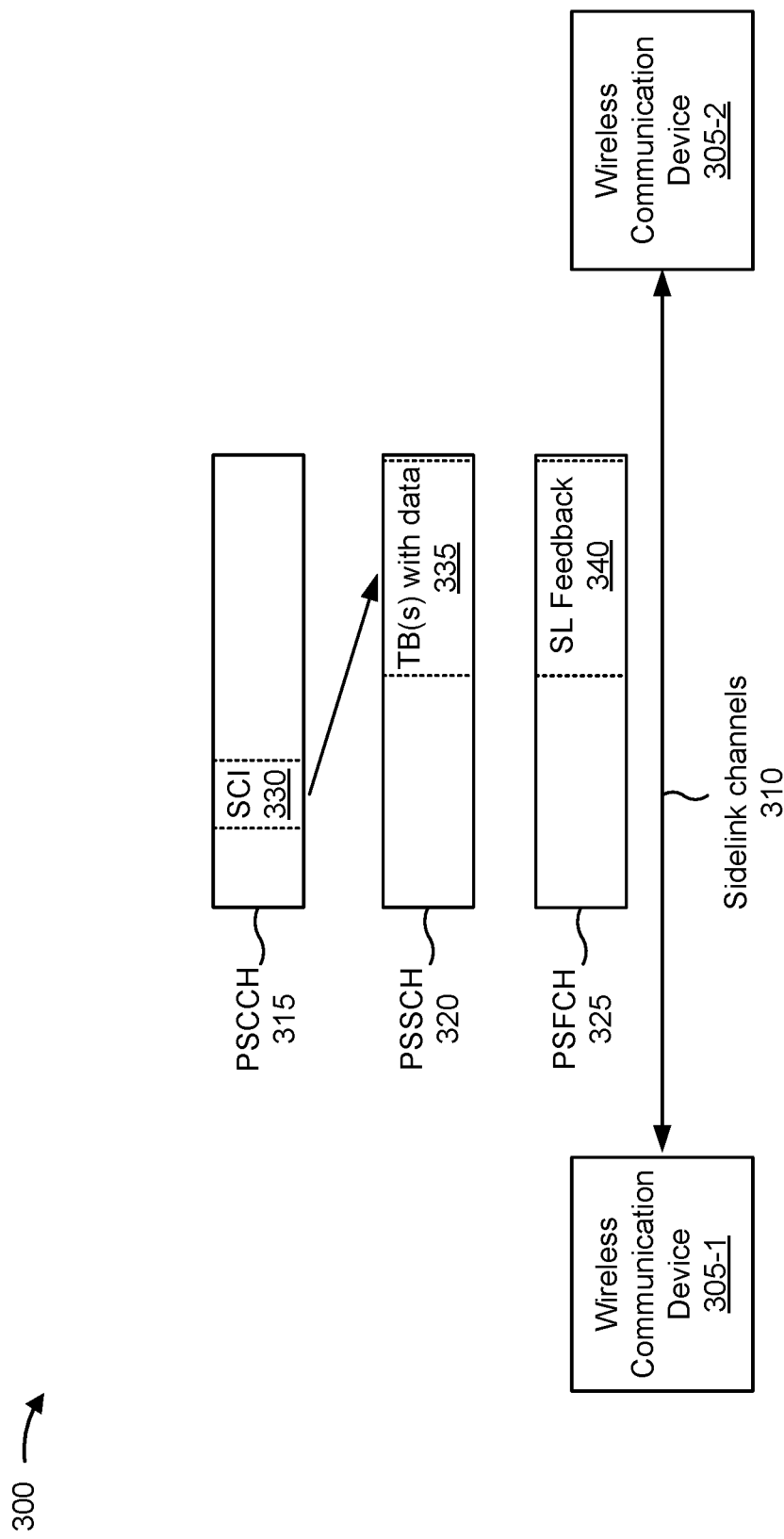
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first wireless communication device 305-1 may communicate with a second wireless communication device 305-2 (and one or more other wireless communication devices 305) via one or more sidelink channels 310. Wireless communication devices 305-1 and 305-2 may communicate using one or more sidelink channels 310 for P2P communications, D2D communications, V2X communications (e.g., which may include V2V communications, V2I communications, V2P communications), and/or mesh networking. In some aspects, wireless communication devices 305 (e.g., wireless communication device 305-1 and/or wireless communication device 305-2) may correspond to one or more UEs 120, BSs 110, integrated access and backhaul nodes, and/or the like. In some aspects, one or more sidelink channels 310 may use a PC5 interface and/or may operate in a high frequency band (e.g., the 5.9 GHz band). Additionally, or alternatively, wireless communication devices 305 may synchronize timing of transmission time intervals (TTIs) (e.g., frames, subframes, slots, symbols) using global navigation satellite system (GNSS) timing.

As further shown in FIG. 3, one or more sidelink channels 310 may include a physical sidelink control channel (PSCCH) 315, a physical sidelink shared channel (PSSCH) 320, and/or a physical sidelink feedback channel (PSFCH) 325. PSCCH 315 may be used to communicate control information, similar to a physical downlink control channel (PDCCH) and/or a physical uplink control channel (PUCCH) used for cellular communications with a BS 110 via an access link or an access channel PSSCH 320 may be used to communicate data, similar to a physical downlink shared channel (PDSCH) and/or a physical uplink shared channel (PUSCH) used for cellular communications with a BS 110 via an access link or an access channel. For example, PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on PSSCH 320. TB 335 may include data. PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, HARQ feedback (ACK/NACK) for downlink Uu may be carried on an uplink channel, such as in a physical uplink control channel or piggybacked on a physical uplink shared channel. The HARQ feedback may acknowledge downlink data on a PDSCH or a downlink grant on PDSCH (SPS release). HARQ feedback may use a codebook that is semi-static (ACK/NACK bit sent if no grant is received) or dynamic (ACK/NACK bit sent if grant is received). However, sidelink has some extra considerations. For example, stages of multi-stage grants may be transmitted by different nodes (grant may be split between Uu downlink control information and SCI). Also, a single UE may communicate with multiple UEs on multiple sidelinks (unicast or groupcast). UEs may relay grants from other UEs.

In some aspects, one or more sidelink channels 310 may use resource pools. For example, a scheduling assignment (e.g., included in SCI 330) may be transmitted in subchannels using specific resource blocks (RBs) across time. In some aspects, data transmissions (e.g., on PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a wireless communication device 305 may operate using a transmission mode where resource selection and/or scheduling is performed by the wireless communication device 305 (e.g., rather than a BS 110). In some aspects, wireless communication device 305 may perform resource selection and/or scheduling by sensing channel availability for transmissions. For example, wireless communication device 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and/or the like, and may select a channel for transmission of a sidelink communication based at least in part on the measurement(s).

Additionally, or alternatively, wireless communication device 305 may perform resource selection and/or scheduling using SCI 330 received in PSCCH 315, which may indicate occupied resources, and/or channel parameters. Additionally, or alternatively, wireless communication device 305 may perform resource selection and/or scheduling by determining a channel busy rate (CBR) associated with various sidelink channels, which may be used for rate control (e.g., by indicating a maximum number of resource blocks that the wireless communication device 305 can use for a particular set of subframes).

In the transmission mode where resource selection and/or scheduling is performed by a wireless communication device 305, wireless communication device 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on PSSCH 320 (e.g., for TBs 335), one or more subframes to be used for the upcoming sidelink transmission, a modulation and coding scheme (MCS) to be used for the upcoming sidelink transmission, and/or the like. In some aspects, a wireless communication device 305 may generate a sidelink grant that indicates one or more parameters for semi-persistent scheduling (SPS), such as a periodicity of a sidelink transmission. Additionally, or alternatively, wireless communication device 305 may generate a sidelink grant for event-driven scheduling, such as for an on-demand sidelink message.

As indicated above, FIG. 3 is provided as an example. Other examples may differ from what is described with respect to FIG. 3.

Figure 4:
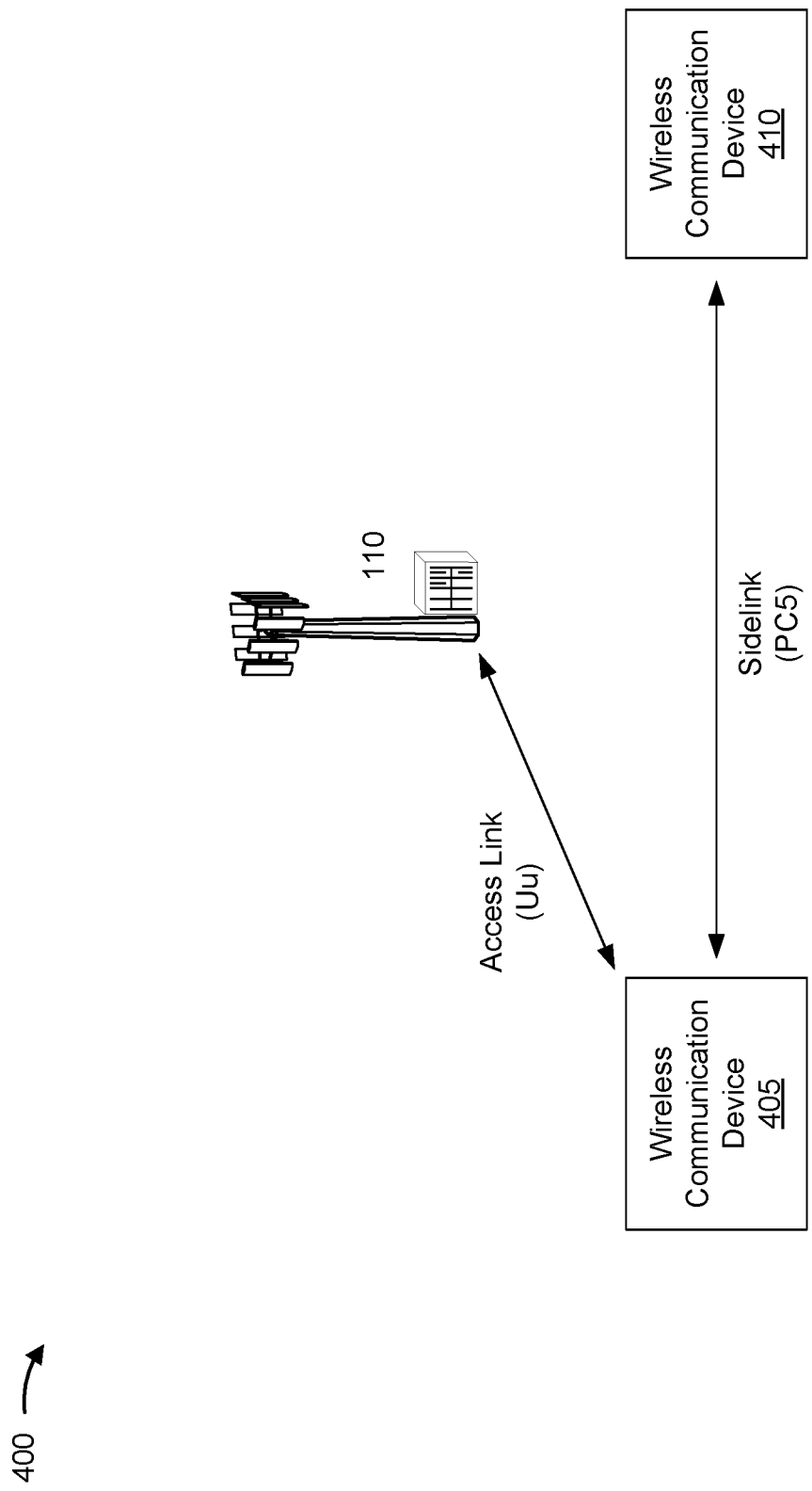
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a wireless communication device 405 and a wireless communication device 410 may communicate with one another via a sidelink, as described above in connection with FIG. 3. As further shown, in some sidelink modes, a BS 110 may communicate with wireless communication device 405 via a first access link. Wireless communication device 405 and/or wireless communication device 410 may correspond to one or more UEs 120, BSs 110, and/or integrated access and backhaul (IAB) nodes. As an example, "sidelink" may refer to a direct link between UEs 120, and "access link" may refer to a direct link between a BS 110 and a UE 120. Sidelink communications may be transmitted on a PC5 interface via the sidelink, and access link communications may be transmitted via the access link. An access link communication may be either a downlink communication (from a BS 110 to a UE 120) or an uplink communication (from a UE 120 to a BS 110) on a Uu interface.

Communication between wireless communication device 405 and wireless communication device 410, with BS 110 allocating resources for sidelink transmissions, may be referred to as Mode 1 sidelink communication. In Mode 1, wireless communication device 405 may be a relay UE for wireless communication device 410 (remote UE). Communication between wireless communication device 405 and wireless communication device 410, without involving BS 110, may be referred to as Mode 2 sidelink communication.

As indicated above, FIG. 4 is provided as an example. Other examples may differ from what is described with respect to FIG. 4.

As described above, wireless communication devices may communicate with a sidelink. However, a wireless communication device may waste power and signaling resources if the wireless communication device tries to maintain a sidelink (e.g., PSSCH) that is inactive, degraded, or often unavailable. For example, the sidelink may become inactive for a long period, suffer a sufficient degradation in quality, or use a frequency channel that is often busy (persistent channel sensing failures). Some aspects described herein enable a wireless communication device to determine whether to maintain the sidelink or to release the sidelink. If the sidelink is disabled or released when appropriate, the wireless communication device may save power and signaling resources that were used to maintain the sidelink and to monitor a corresponding PSCCH. In some aspects, the wireless communication device may report that the sidelink is released to other wireless communication devices and/or to a base station.

Figure 5:
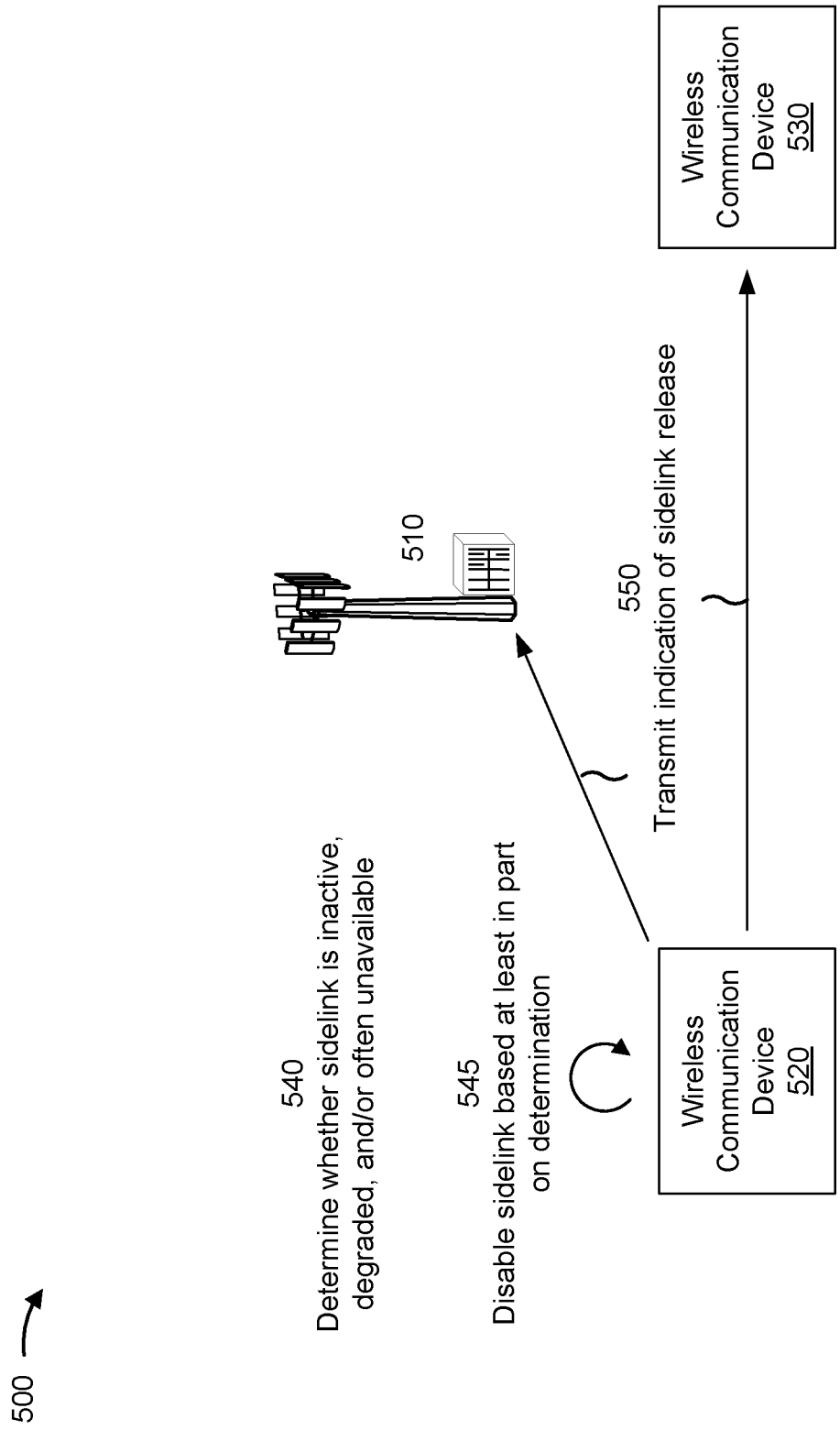
FIG. 5 is a diagram illustrating an example of link management of a sidelink, in accordance with the present disclosure.

FIG. 5 is a diagram illustrating an example 500 of link management of a sidelink, in accordance with the present disclosure. FIG. 5 shows a base station (BS) 510 (e.g., BS 110 depicted in FIGS. 1, 2, and 4) and a wireless communication device 520 (e.g., UE 120 depicted in FIGS. 1 and 2, wireless communication device 305-1 depicted in FIG. 3, wireless communication device 405 depicted in FIG. 4) that, in some scenarios, can communicate with each other. Wireless communication device 520 may be a relay UE. In some scenarios, wireless communication device 520 does not communicate with BS 510. FIG. 5 also shows a wireless communication device 530 (e.g., UE 120, wireless communication device 305-2 depicted in FIG. 3, wireless communication device 410 depicted in FIG. 4) that can communicate with wireless communication device 520 but not BS 510. Wireless communication device 530 may be a remote UE. In some aspects, wireless communication device 520 and/or wireless communication device 530 may be located in vehicles, on pedestrians, and/or on infrastructure.

As shown by reference number 540, wireless communication device 520 may determine whether a sidelink between wireless communication device 520 and wireless communication device 530 is inactive, degraded, and/or often unavailable. As shown by reference number 545, wireless communication device 520 may disable the sidelink based at least in part on a determination that the sidelink is inactive, degraded, and/or busy. Wireless communication device 520 may thus discontinue communicating on the sidelink over a PSSCH and/or may discontinue monitoring a PSCCH. As a result, wireless communication device 520 and wireless communication device 530 may save power and signaling resources.

In some aspects, wireless communication device 520 may determine that the sidelink is inactive. For example, wireless communication device 520 may determine whether the sidelink is inactive by determining whether a timer for inactivity on the sidelink satisfies an inactivity duration threshold (e.g., duration of inactivity, quantity of transmissions). Inactivity may include no data transmissions on the sidelink. Inactivity may also include no control transmissions on the sidelink. Wireless communication device 520 may disable the sidelink based at least in part on determining that the timer satisfies the inactivity duration threshold. For example, a 30 second duration of inactivity may exceed a 25 second inactivity duration threshold. A duration of the timer may be either preconfigured at wireless communication device 520 and/or may be shared or negotiated between wireless communication device 520 and wireless communication device 530 during establishment of the sidelink. The timer may be started or restarted by a transmission or a reception of new data. The new data may be a first transmission in a HARQ process. In some aspects, such as in Mode 1, the timer may be reset by a transmission or a reception of a PDSCH indication from BS 510.

In some aspects, wireless communication device 520 may determine that the sidelink is inactive by making a prediction that there will be no more communications on the sidelink for a time duration. Wireless communication device 520 may make the prediction based at least in part on a recent communication from wireless communication device 530, a traffic pattern on the sidelink for a time of day, a location and/or a direction of wireless communication device 520, a location and/or a direction of wireless communication device 530, and/or activity nearby.

In some aspects, wireless communication device 520 may determine that a quality of the sidelink is degraded. For example, wireless communication device 530 may transmit reference signals for wireless communication device 520 to measure. The reference signals may be the same reference signals that are used on a Uu link, such as a synchronization signal block, a channel state information reference signal (e.g., periodic, semi-persistent, aperiodic), or a DMRS. Wireless communication device 520 and wireless communication device 530 may negotiate which reference signals are to be used. In some aspects, wireless communication device 520 may periodically measure a radio link quality of the sidelink using the reference signals. Wireless communication device 520 may determine an L1-RSRP parameter, an RSSI parameter, and/or an RSRQ parameter.

In some aspects, wireless communication device 520 may determine that a quality of the sidelink does not satisfy a quality threshold. For example, wireless communication device 520 may detect a sidelink link failure (SLF) if a measurement parameter falls below a threshold. Wireless communication device 520 may count SLFs. In some aspects, wireless communication device 520 may determine a count of SLFs per a specified quantity of measurement occasions. If the count of SLFs satisfies a failure threshold for the specified quantity of measurement occasions, wireless communication device 520 may determine that the quality of the sidelink does not satisfy a quality threshold and may disable the sidelink. For example, the failure threshold may be five SLFs within a last ten measurement occasions. If this threshold is met, wireless communication device 520 may release the sidelink.

Alternatively, or additionally, wireless communication device 520 may count SLFs during an SLF detection timer. Each SLF may start or restart the SLF detection timer and increment the count of SLFs by one. When the SLF detection timer expires, the count of SLFs may reset to zero. Wireless communication device 520 may determine that the quality of the link does not satisfy the quality threshold based at least in part on a determination that the count of SLFs satisfies a failure count threshold during the SLF detection timer. In some aspects, a duration of the SLF detection timer may be based at least in part on an integer multiple of a period for a link quality measurement.

In some aspects, wireless communication device 520 may determine that a sidelink is often unavailable or too busy. For example, wireless communication device 520 may determine whether an amount of unavailability of the sidelink satisfies an unavailability threshold and disable the sidelink based at least in part on a determination that the amount of unavailability of the sidelink satisfies the unavailability threshold. For example, in Mode 2, before wireless communication device 520 can transmit on the sidelink to wireless communication device 530, wireless communication device 520 may check an availability of the sidelink by sensing an energy level on the channel for a certain amount of time. This may be a listen-before-talk (LBT) procedure. If the busy signal is detected for a certain period of time, the channel is considered busy and the LBT procedure fails. If the sidelink is unavailable for a threshold amount of time, wireless communication device may determine that the sidelink is too busy and disable the sidelink. The threshold amount of time may be based at least in part on a count of LBT procedure failures satisfying a failure count threshold, a percentage or fraction of time that the sidelink is busy, and/or a total amount of busy time.

In some aspects, as shown by reference number 550, wireless communication device 520 may transmit an indication that the sidelink is released (e.g., via PC5 radio resource control (RRC) signaling). In some aspects, wireless communication device 520 may provide an indication of why the sidelink is released (e.g., inactive, degraded, too busy). Wireless communication device 520 may transmit the indication to wireless communication device 530 such that wireless communication device 530 discontinues monitoring the PSCCH and/or takes other steps as a result of the sidelink being released. In some aspects, wireless communication device 520 may transmit a request to release the sidelink to wireless communication device 530, which may respond by granting the request or discarding the request.

Alternatively, and or additionally, wireless communication device 520 may transmit the indication to BS 510. BS 510 may determine that wireless communication device 520 is no longer a relay UE for wireless communication device 530. BS 510 may therefore discontinue scheduling resources for wireless communication device 520 and/or wireless communication device 530. BS 510 may select another wireless communication device to be a relay UE or determine that BS 510 may not use a relay UE at all. As a result, BS 510 may also save signaling resources.

As indicated above, FIG. 5 is provided as an example. Other examples may differ from what is described with respect to FIG. 5.

Figure 6:
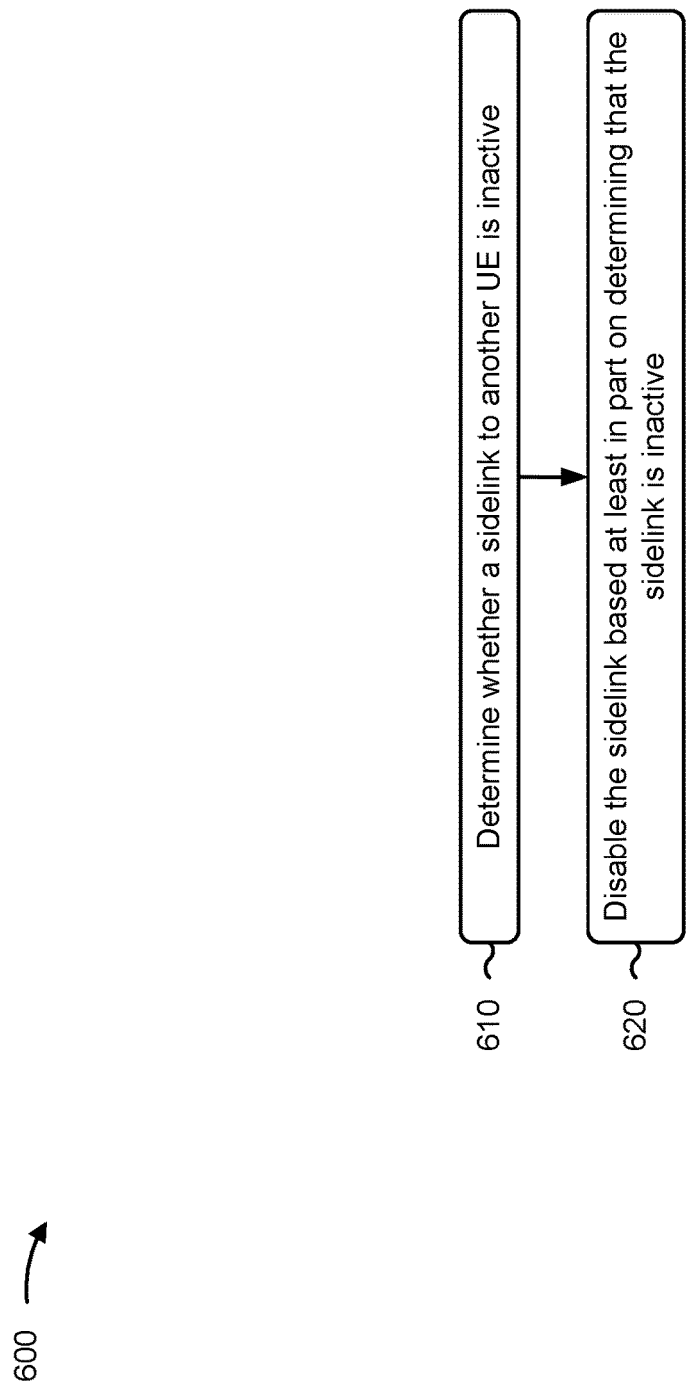
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120 depicted in FIGS. 1 and 2, wireless communication device 305 depicted in FIG. 3, wireless communication devices 405 and 410 depicted in FIG. 4, wireless communication devices 520 and 530 depicted in FIG. 5) performs operations associated with link management for sidelink.

As shown in FIG. 6, in some aspects, process 600 may include determining whether a sidelink to another UE is inactive (block 610). For example, the UE (e.g., using receive processor 258, transmit processor 264, controller/processor 280, memory 282) may determine whether a sidelink to another UE is inactive, as described above.

As further shown in FIG. 6, in some aspects, process 600 may include disabling the sidelink based at least in part on determining that the sidelink is inactive (block 620). For example, the UE (e.g., using receive processor 258, transmit processor 264, controller/processor 280, memory 282) may disable the sidelink based at least in part on determining that the sidelink is inactive, as described above.

Process 600 may include additional aspects, such as any single aspect or any combination of aspects described below and/or in connection with one or more other processes described elsewhere herein.

In a first aspect, determining whether the sidelink is inactive includes determining whether a timer for inactivity on the sidelink satisfies an inactivity duration threshold, and disabling the sidelink includes disabling the sidelink based at least in part on determining that the timer satisfies the inactivity duration threshold.

In a second aspect, alone or in combination with the first aspect, process 600 includes starting the timer based at least in part on one of receiving a sidelink data communication or transmitting a sidelink data communication.

In a third aspect, alone or in combination with one or more of the first and second aspects, process 600 includes starting the timer based at least in part on one of receiving a HARQ message or transmitting a HARQ message.

In a fourth aspect, alone or in combination with one or more of the first through third aspects, process 600 includes starting the timer based at least in part on one of receiving a sidelink communication on a PSCCH or transmitting a sidelink communication on the PSCCH.

In an fifth aspect, alone or in combination with one or more of the first through fourth aspects, process 600 includes configuring the inactivity duration threshold based at least in part on information received from one of the other UE or a base station.

In a sixth aspect, alone or in combination with one or more of the first through fifth aspects, process 600 includes transmitting a message that indicates that the UE is releasing the sidelink.

In a seventh aspect, alone or in combination with one or more of the first through sixth aspects, disabling the sidelink includes disabling the sidelink based at least in part on receiving a grant of the request.

In an eighth aspect, alone or in combination with one or more of the first through seventh aspects, the request is based at least in part on a prediction that there will be no more communications on the sidelink for a time duration.

In a ninth aspect, alone or in combination with one or more of the first through eighth aspects, disabling the sidelink includes discontinuing monitoring of one or more of a PSCCH or PSSCH over the sidelink.

In a tenth aspect, alone or in combination with one or more of the first through ninth aspects, disabling the sidelink includes disabling the sidelink based at least in part on receiving the message.

In an eleventh aspect, alone or in combination with one or more of the first through tenth aspects, process 600 includes transmitting a message granting the request.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
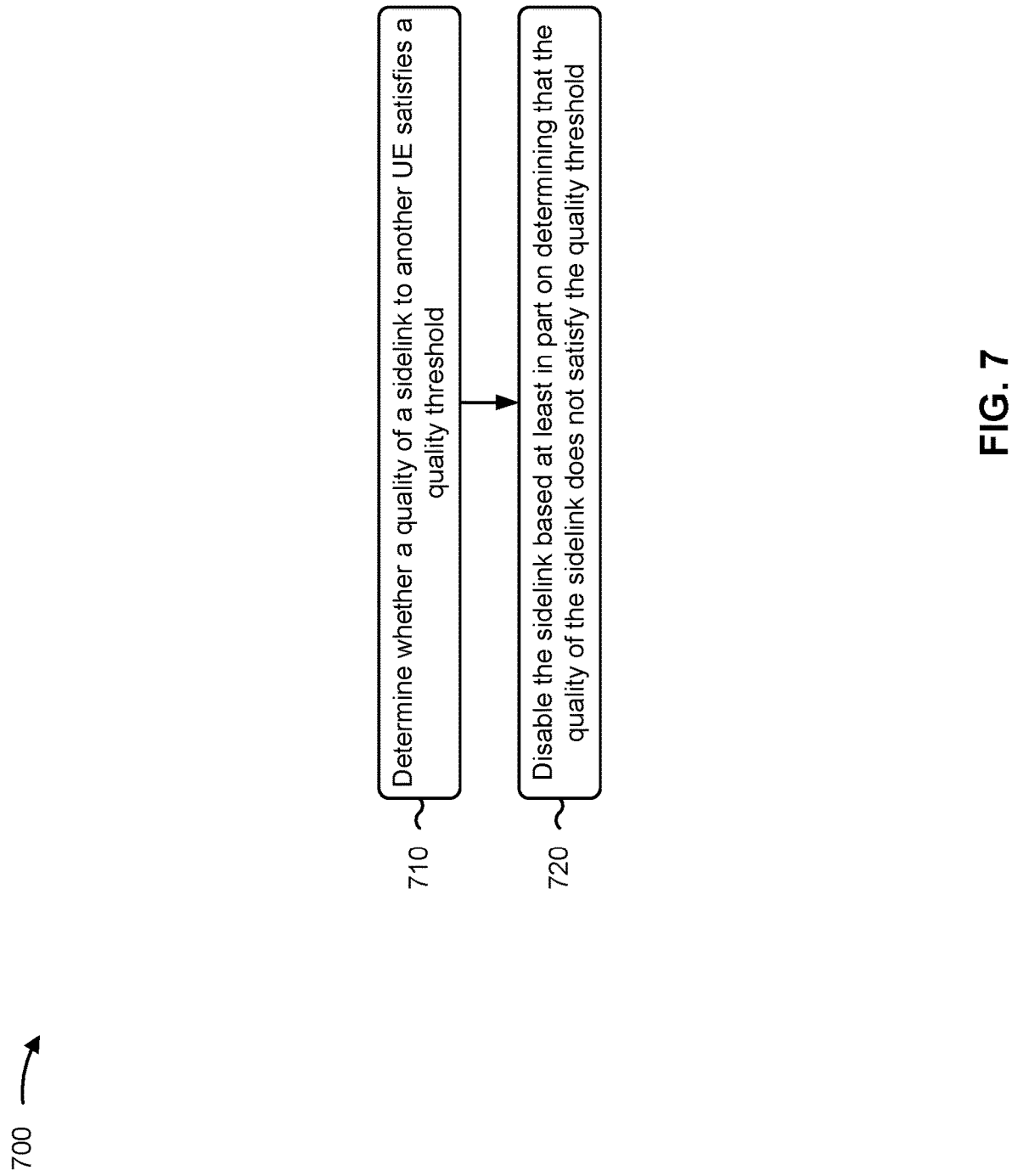
FIG. 7 is a diagram illustrating an example process performed, for example, by a UE, in accordance with the present disclosure.

FIG. 7 is a diagram illustrating an example process 700 performed, for example, by a UE, in accordance with the present disclosure. Example process 700 is an example where the UE (e.g., UE 120 depicted in FIGS. 1 and 2, wireless communication device 305 depicted in FIG. 3, wireless communication devices 405 and 410 depicted in FIG. 4, wireless communication devices 520 and 530 depicted in FIG. 5) performs operations associated with link management for sidelink.

As shown in FIG. 7, in some aspects, process 700 may include determining whether a quality of a sidelink to another UE satisfies a quality threshold (block 710). For example, the UE (e.g., using receive processor 258, transmit processor 264, controller/processor 280, memory 282) may determine whether a quality of a sidelink to another UE satisfies a quality threshold, as described above.

As further shown in FIG. 7, in some aspects, process 700 may include disabling the sidelink based at least in part on determining that the quality of the sidelink does not satisfy the quality threshold (block 720). For example, the UE (e.g., using receive processor 258, transmit processor 264, controller/processor 280, memory 282) may disable the sidelink based at least in part on determining that the quality of the sidelink does not satisfy the quality threshold, as described above.

Process 700 may include additional aspects, such as any single aspect or any combination of aspects described below and/or in connection with one or more other processes described elsewhere herein.

In a first aspect, determining whether the quality of the sidelink does not satisfy the quality threshold includes measuring one or more reference signals from the other UE.

In a second aspect, alone or in combination with the first aspect, process 700 includes incrementing a failure count based at least in part on a determination that a measurement does not satisfy a measurement threshold, and determining that the quality of the sidelink does not satisfy the quality threshold based at least in part on determining that the failure count satisfies a failure count threshold.

In a third aspect, alone or in combination with one or more of the first and second aspects, determining that the failure count satisfies the failure count threshold includes determining that the failure count satisfies the failure count threshold for a particular quantity of measurement occasions.

In a fourth aspect, alone or in combination with one or more of the first through third aspects, process 700 includes resetting the failure count upon expiration of a failure count timer.

In a fifth aspect, alone or in combination with one or more of the first through fourth aspects, process 700 includes transmitting one or more reference signals for the other UE to measure.

In a sixth aspect, alone or in combination with one or more of the first through fifth aspects, disabling the sidelink includes discontinuing monitoring of one or more of a PSCCH or a PSSCH.

In a seventh aspect, alone or in combination with one or more of the first through sixth aspects, process 700 includes transmitting a message indicating that the UE is releasing the sidelink with the other UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
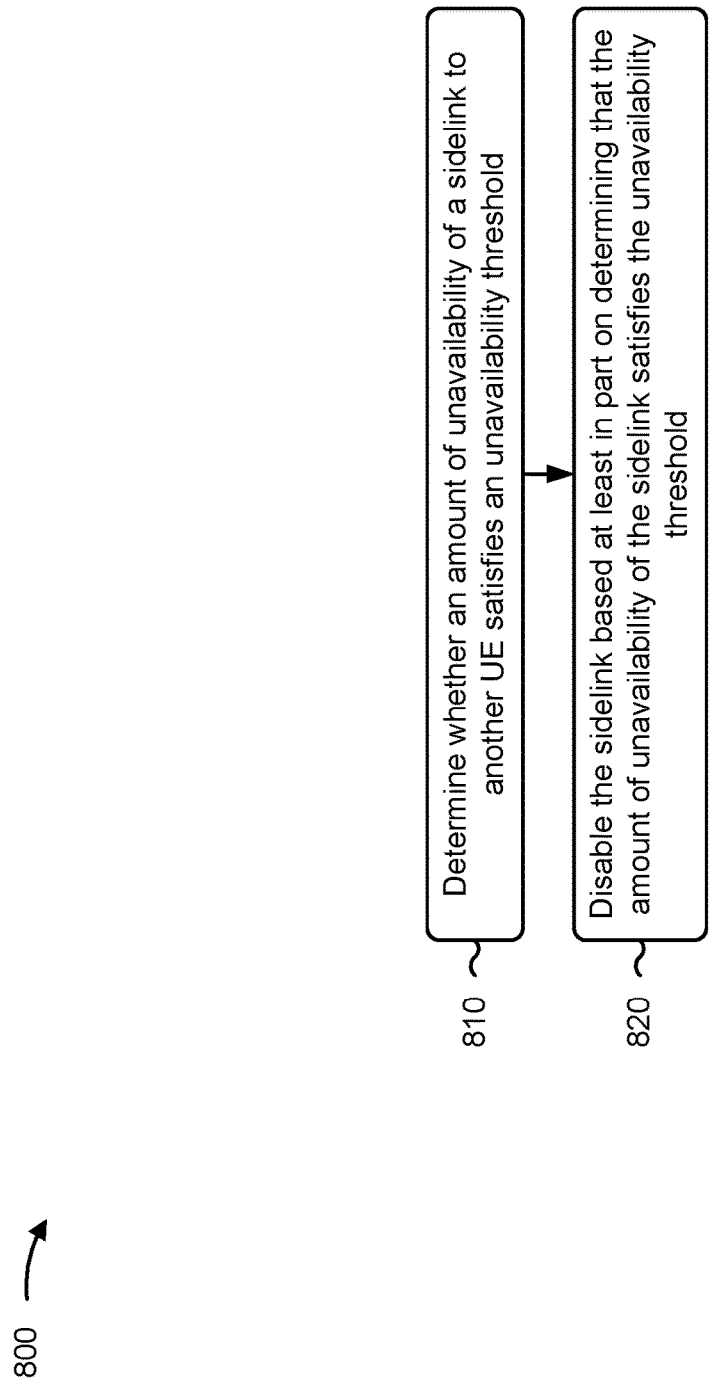
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120 depicted in FIGS. 1 and 2, wireless communication device 305 depicted in FIG. 3, wireless communication devices 405 and 410 depicted in FIG. 4, wireless communication devices 520 and 530 depicted in FIG. 5) performs operations associated with link management for sidelink.

As shown in FIG. 8, in some aspects, process 800 may include determining whether an amount of unavailability of a sidelink to another UE satisfies an unavailability threshold (block 810). For example, the UE (e.g., using receive processor 258, transmit processor 264, controller/processor 280, memory 282) may determine whether an amount of unavailability of a sidelink to another UE satisfies an unavailability threshold, as described above.

As further shown in FIG. 8, in some aspects, process 800 may include disabling the sidelink based at least in part on determining that the amount of unavailability of the sidelink satisfies the unavailability threshold (block 820). For example, the UE (e.g., using receive processor 258, transmit processor 264, controller/processor 280, memory 282) may disable the sidelink based at least in part on determining that the amount of unavailability of the sidelink satisfies the unavailability threshold, as described above.

Process 800 may include additional aspects, such as any single aspect or any combination of aspects described below and/or in connection with one or more other processes described elsewhere herein.

In a first aspect, determining whether the amount of unavailability of the sidelink satisfies the unavailability threshold includes performing an LBT procedure on the sidelink and increasing the amount of unavailability based at least in part on a determination that the LBT procedure has failed.

In a second aspect, alone or in combination with the first aspect, determining whether the amount of unavailability of the sidelink satisfies the unavailability threshold includes incrementing a count of LBT procedure failures and determining that the amount of unavailability of the sidelink satisfies the unavailability threshold based at least on part in a determination that the count satisfies a failure count threshold.

In a third aspect, alone or in combination with one or more of the first and second aspects, process 800 includes resetting the count upon expiration of an LBT count timer.

In a fourth aspect, alone or in combination with one or more of the first through third aspects, disabling the sidelink includes discontinuing monitoring of one or more of a PSCCH or a PSSCH.

In a fifth aspect, alone or in combination with one or more of the first through fourth aspects, process 800 includes transmitting a message indicating that the UE is releasing the sidelink with the other UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
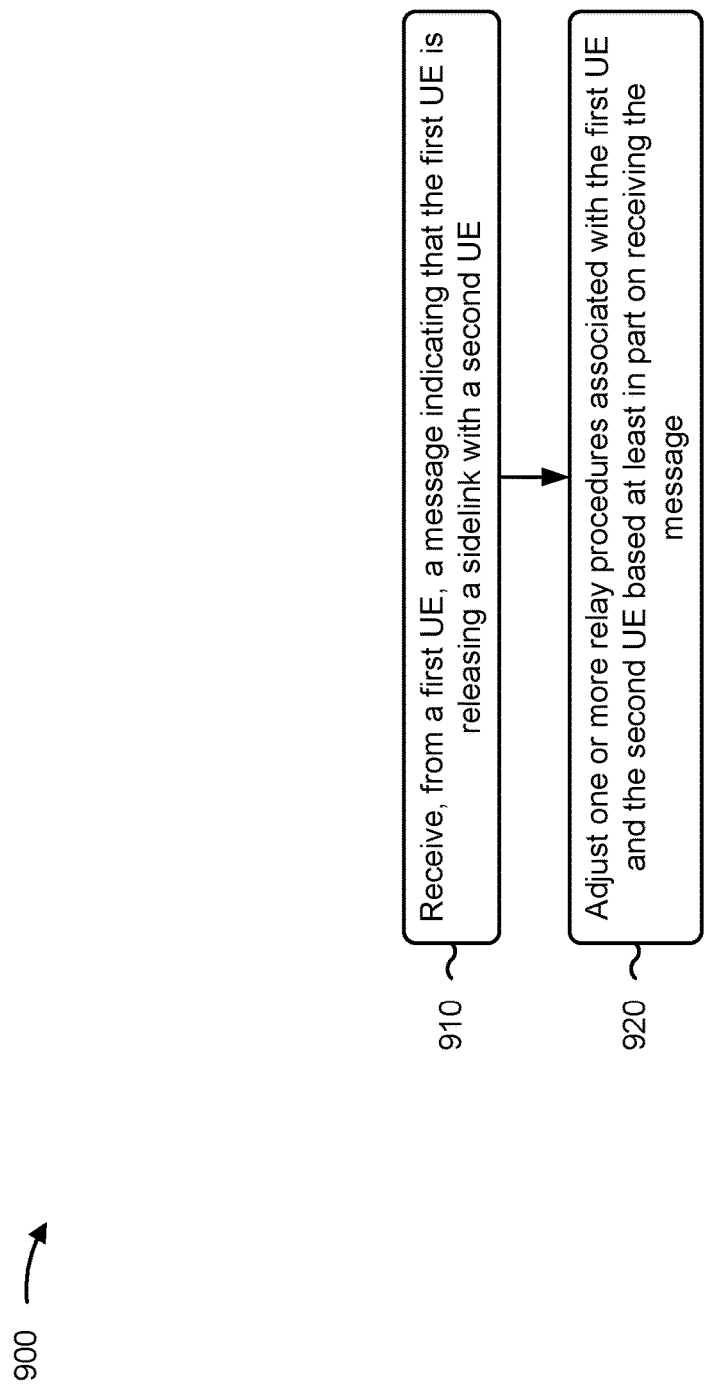
FIG. 9 is a diagram illustrating an example process performed, for example, by a base station, in accordance with the present disclosure.

FIG. 9 is a diagram illustrating an example process 900 performed, for example, by a base station, in accordance with the present disclosure. Example process 900 is an example where the base station (e.g., BS 110 depicted in FIGS. 1, 2, and 4, BS 510 depicted in FIG. 5) performs operations associated with link management for sidelink.

As shown in FIG. 9, in some aspects, process 900 may include receiving, from a first UE, a message indicating that the first UE is releasing a sidelink with a second UE (block 910). For example, the base station (e.g., using transmit processor 220, receive processor 238, controller/processor 240, memory 242) may receive, from a first UE, a message indicating that the first UE is releasing a sidelink with a second UE, as described above.

As further shown in FIG. 9, in some aspects, process 900 may include adjusting one or more relay procedures associated with the first UE and the second UE based at least in part on receiving the message (block 920). For example, the base station (e.g., using transmit processor 220, receive processor 238, controller/processor 240, memory 242) may adjust one or more relay procedures associated with the first UE and the second UE based at least in part on receiving the message, as described above.

Process 900 may include additional aspects, such as any single aspect or any combination of aspects described below and/or in connection with one or more other processes described elsewhere herein.

In a first aspect, adjusting the one or more relay procedures includes dropping the first UE as a relay UE to the second UE, and selecting a third UE with a sidelink to the second UE as a relay to the second UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

The following provides an overview of some aspects of the present disclosure:

Aspect 1: A method of wireless communication performed by a user equipment (UE), comprising: determining whether a sidelink to another UE is inactive; and disabling the sidelink based at least in part on determining that the sidelink is inactive.

Aspect 2: The method of aspect 1, wherein determining whether the sidelink is inactive includes determining whether a timer for inactivity on the sidelink satisfies an inactivity duration threshold, and wherein disabling the sidelink includes disabling the sidelink based at least in part on determining that the timer satisfies the inactivity duration threshold.

Aspect 3: The method of aspect 2, further comprising starting the timer based at least in part on one of receiving a sidelink data communication or transmitting a sidelink data communication.

Aspect 4: The method of aspect 2, further comprising starting the timer based at least in part on one of receiving a hybrid automatic repeat request (HARQ) message or transmitting a HARQ message.

Aspect 5: The method of aspect 2, further comprising starting the timer based at least in part on one of receiving a sidelink communication on a physical sidelink control channel (PSCCH) or transmitting a sidelink communication on the PSCCH.

Aspect 6: The method of aspect 2, further comprising configuring the inactivity duration threshold based at least in part on information received from one of the other UE or a base station.

Aspect 7: The method of any of aspects 1-6, further comprising transmitting a message that indicates that the UE is releasing the sidelink.

Aspect 8: The method of any of aspects 1-7, further comprising transmitting a message that includes a request to release the sidelink, and wherein disabling the sidelink includes disabling the sidelink based at least in part on receiving a grant of the request.

Aspect 9: The method of aspect 8, wherein the request is based at least in part on a prediction that there will be no more communications on the sidelink for a time duration.

Aspect 10: The method of any of aspects 1-9, wherein disabling the sidelink includes discontinuing monitoring of one or more of a physical sidelink control channel or a physical sidelink shared channel over the sidelink.

Aspect 11: The method of any of aspects 1-10, further comprising receiving a message from the other UE to release the sidelink, and wherein disabling the sidelink includes disabling the sidelink based at least in part on receiving the message.

Aspect 12: The method of any of aspects 1-11, further comprising receiving a request to release the sidelink, and wherein the method includes transmitting a message granting the request.

Aspect 13: A method of wireless communication performed by a user equipment (UE), comprising: determining whether a quality of a sidelink to another UE satisfies a quality threshold; and disabling the sidelink based at least in part on determining that the quality of the sidelink does not satisfy the quality threshold.

Aspect 14: The method of aspect 13, wherein determining whether the quality of the sidelink does not satisfy the quality threshold includes measuring one or more reference signals from the other UE.

Aspect 15: The method of aspect 14, further comprising incrementing a failure count based at least in part on a determination that a measurement does not satisfy a measurement threshold, and determining that the quality of the sidelink does not satisfy the quality threshold based at least in part on determining that the failure count satisfies a failure count threshold.

Aspect 16: The method of aspect 15, wherein determining that the failure count satisfies the failure count threshold includes determining that the failure count satisfies the failure count threshold for a particular quantity of measurement occasions.

Aspect 17: The method of aspect 15, further comprising resetting the failure count upon expiration of a failure count timer.

Aspect 18: The method of any of aspects 13-17, further comprising transmitting one or more reference signals for the other UE to measure.

Aspect 19: The method of any of aspects 13-17, wherein disabling the sidelink includes discontinuing monitoring of one or more of a physical sidelink control channel or a physical sidelink shared channel.

Aspect 20: The method of any of aspects 13-19, further comprising transmitting a message indicating that the UE is releasing the sidelink with the other UE.

Aspect 21: A method of wireless communication performed by a user equipment (UE), comprising: determining whether an amount of unavailability of a sidelink to another UE satisfies an unavailability threshold; and disabling the sidelink based at least in part on determining that the amount of unavailability of the sidelink satisfies the unavailability threshold.

Aspect 22: The method of aspect 21, wherein determining whether the sidelink satisfies the unavailability threshold includes performing a listen before talk (LBT) procedure on the sidelink and increasing the amount of unavailability based at least in part on a determination that the LBT procedure has failed.

Aspect 23: The method of aspect 21 or 22, wherein determining whether the sidelink satisfies the unavailability threshold includes incrementing a count of listen before talk (LBT) procedure failures and determining that the sidelink satisfies the unavailability threshold based at least on part in a determination that the count satisfies a failure count threshold.

Aspect 24: The method of aspect 23, further comprising resetting the count upon expiration of an LBT count timer.

Aspect 25: The method of any of aspects 21-24, wherein disabling the sidelink includes discontinuing monitoring of one or more of a physical sidelink control channel or a physical sidelink shared channel.

Aspect 26: The method of any of aspects 21-24, further comprising transmitting a message indicating that the UE is releasing the sidelink with the other UE.

Aspect 27: A method of wireless communication performed by a base station, comprising: receiving, from a first user equipment (UE), a message indicating that the first UE is releasing a sidelink with a second UE; and adjusting one or more relay procedures associated with the first UE and the second UE based at least in part on receiving the message.

Aspect 28: The method of aspect 27, wherein adjusting the one or more relay procedures includes dropping the first UE as a relay UE to the second UE, and selecting a third UE with a sidelink to the second UE as a relay to the second UE.

Aspect 29: An apparatus for wireless communication at a device, comprising a processor; memory coupled with the processor; and instructions stored in the memory and executable by the processor to cause the apparatus to perform the method of one or more aspects of aspects 1-28.

Aspect 30: A device for wireless communication, comprising a memory and one or more processors coupled to the memory, the memory and the one or more processors configured to perform the method of one or more aspects of aspects 1-28.

Aspect 31: An apparatus for wireless communication, comprising at least one means for performing the method of one or more aspects of aspects 1-28.

Aspect 32: A non-transitory computer-readable medium storing code for wireless communication, the code comprising instructions executable by a processor to perform the method of one or more aspects of aspects 1-28.

Aspect 33: A non-transitory computer-readable medium storing a set of instructions for wireless communication, the set of instructions comprising one or more instructions that, when executed by one or more processors of a device, cause the device to perform the method of one or more aspects of aspects 1-28.

As used herein, the term "component" is intended to be broadly construed as hardware, firmware, and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware, firmware, and/or a combination of hardware and software.

It will be apparent that systems and/or methods described herein may be implemented in different forms of hardware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more processors configured to:
      determine whether a sidelink to another UE is inactive based at least in part on a prediction by the UE of whether there will be no more communications on the sidelink for a time duration, the prediction being based at least in part on a traffic pattern on the sidelink for a time of day;
      determine whether a quality of the sidelink satisfies a quality threshold;
      determine whether an amount of unavailability of the sidelink satisfies an unavailability threshold; and
      disable the sidelink based at least in part on at least two of:
         a determination that the sidelink is inactive,
         a determination that the quality of the sidelink fails to satisfy a quality threshold, or a determination that the amount of unavailability of the sidelink satisfies the unavailability threshold.

2. The UE of claim 1, wherein:
to determine whether the sidelink is inactive, the one or more processors are configured to determine whether a timer for inactivity on the sidelink satisfies an inactivity duration threshold, and
to disable the sidelink, the one or more processors are configured to disable the sidelink based at least in part on a determination that the timer satisfies the inactivity duration threshold.

3. The UE of claim 2, wherein the one or more processors are further configured to start the timer based at least in part on one of reception of a sidelink data communication or transmission of a sidelink data communication.

4. A user equipment (UE) for wireless communication, comprising:
one or more memories; and
one or more processors coupled to the one or more memories, the one or more processors configured to:
start a timer for inactivity on a sidelink to another UE based at least in part on one of reception of a hybrid automatic repeat request (HARQ) message or transmission of a HARQ message, wherein the timer is configured to be reset by reception of a physical downlink shared channel indication from a base station;
determine whether the sidelink is inactive based at least in part on whether the timer satisfies an inactivity duration threshold;
determine whether a quality of the sidelink satisfies a quality threshold;
determine whether an amount of unavailability of the sidelink satisfies an unavailability threshold; and
disable the sidelink based at least in part on at least two of:
a determination that that the timer satisfies the inactivity duration threshold,
a determination that the quality of the sidelink fails to satisfy a quality threshold, or
a determination that the amount of unavailability of the sidelink satisfies the unavailability threshold.

5. The UE of claim 2, wherein the one or more processors are further configured to start the timer based at least in part on one of reception of a sidelink communication on a physical sidelink control channel (PSCCH) or transmission of a sidelink communication on the PSCCH.

6. The UE of claim 2, wherein the one or more processors are further configured to configure the inactivity duration threshold based at least in part on information received from one of the other UE or a base station.

7. The UE of claim 1, wherein the one or more processors are further configured to transmit a message that indicates that the UE is releasing the sidelink.

8. The UE of claim 1, wherein:
the one or more processors are further configured to transmit a message that includes a request to release the sidelink, and
to disable the sidelink, the one or more processors are configured to disable the sidelink based at least in part on reception of a grant of the request.

9. The UE of claim 8, wherein the request is based at least in part on the prediction that there will be no more communications on the sidelink for the time duration.

10. The UE of claim 1, wherein the one or more processors, to disable the sidelink, are configured to discontinue monitoring of one or more of a physical sidelink control channel or a physical sidelink shared channel over the sidelink.

11. The UE of claim 1, wherein:
the one or more processors are further configured to receive a message from the other UE to release the sidelink, and
to disable the sidelink, the one or more processors are configured to disable the sidelink based at least in part on reception of the message.

12. The UE of claim 1, wherein the one or more processors are further configured to receive a request to release the sidelink, and transmit a message granting the request.

13. The UE of claim 4, wherein the one or more processors are further configured to transmit a message that indicates that the UE is releasing the sidelink.

14. The UE of claim 4, wherein:
the one or more processors are further configured to transmit a message that includes a request to release the sidelink, and
to disable the sidelink, the one or more processors are configured to disable the sidelink based at least in part on reception of a grant of the request.

15. The UE of claim 14, wherein the request is based at least in part on a prediction that there will be no more communications on the sidelink for a time duration.

16. The UE of claim 4, wherein the one or more processors, to disable the sidelink, are configured to discontinue monitoring of one or more of a physical sidelink control channel or a physical sidelink shared channel over the sidelink.

17. The UE of claim 4, wherein:
the one or more processors are further configured to receive a message from the other UE to release the sidelink, and
to disable the sidelink, the one or more processors are configured to disable the sidelink based at least in part on reception of the message.

18. The UE of claim 4, wherein the one or more processors are further configured to receive a request to release the sidelink, and transmit a message granting the request.

19. A method for wireless communication at a user equipment (UE), comprising:
determining whether a sidelink to another UE is inactive based at least in part on a prediction by the UE of whether there will be no more communications on the sidelink for a time duration, the prediction being based at least in part on a traffic pattern on the sidelink for a time of day;
determining whether a quality of the sidelink satisfies a quality threshold;
determining whether an amount of unavailability of the sidelink satisfies an unavailability threshold; and
disabling the sidelink based at least in part on at least two of:
determining that the sidelink is inactive,
determining that the quality of the sidelink fails to satisfy a quality threshold, or
determining that the amount of unavailability of the sidelink satisfies the unavailability threshold.

20. The method of claim 19, wherein:
determining whether the sidelink is inactive comprises determining whether a timer for inactivity on the sidelink satisfies an inactivity duration threshold, and
disabling the sidelink comprises disabling the sidelink based at least in part on determining that the timer satisfies the inactivity duration threshold.

21. The method of claim 20, further comprising:
starting the timer based at least in part on one of receiving a sidelink data communication or transmitting a sidelink data communication.

22. The method of claim 20, further comprising:
starting the timer based at least in part on one of receiving a sidelink communication on a physical sidelink control channel (PSCCH) or transmitting a sidelink communication on the PSCCH.

23. The method of claim 20, further comprising:
configuring the inactivity duration threshold based at least in part on information received from one of the other UE or a base station.

24. The method of claim 19, further comprising:
transmitting a message that indicates that the UE is releasing the sidelink.

25. The method of claim 19, further comprising:
transmitting a message that includes a request to release the sidelink, wherein disabling the sidelink is based at least in part on receiving a grant of the request.

26. The method of claim 19, wherein disabling the sidelink comprises:
discontinuing monitoring of one or more of a physical sidelink control channel or a physical sidelink shared channel over the sidelink.

27. The method of claim 19, further comprising:
receiving a message from the other UE to release the sidelink, wherein disabling the sidelink is based at least in part on receiving the message.

28. A method for wireless communication at a user equipment (UE), comprising:
starting a timer for inactivity on a sidelink to another UE based at least in part on one of receiving a hybrid automatic repeat request (HARQ) message or transmitting a HARQ message, wherein the timer is configured to be reset by reception of a physical downlink shared channel indication from a base station;
determining whether the sidelink is inactive based at least in part on whether the timer satisfies an inactivity duration threshold;
determining whether a quality of the sidelink satisfies a quality threshold;
determining whether an amount of unavailability of the sidelink satisfies an unavailability threshold; and
disabling the sidelink based at least in part on at least two of:
determining that the timer satisfies the inactivity duration threshold,
determining that the quality of the sidelink fails to satisfy a quality threshold, or
determining that the amount of unavailability of the sidelink satisfies the unavailability threshold.

* * * * *